US009686293B2

(12) United States Patent
Golshan et al.

(10) Patent No.: US 9,686,293 B2
(45) Date of Patent: Jun. 20, 2017

(54) SYSTEMS AND METHODS FOR MALWARE DETECTION AND MITIGATION

(71) Applicant: Cyphort Inc., Santa Clara, CA (US)

(72) Inventors: Ali Golshan, Santa Clara, CA (US);
Fengmin Gong, Livermore, CA (US);
Frank Jas, Scotts Valley, CA (US);
Nick Bilogorskiy, Sunnyvale, CA (US);
Neal Vu, San Jose, CA (US);
Chenghuai Lu, Fremont, CA (US);
Alexander Burt, San Jose, CA (US);
Manikandan Kenyan, Saratoga, CA (US); Yucheng Ting, Milpitas, CA (US)

(73) Assignee: Cyphort Inc., Santa Clara, CA (US)

( * ) Notice: Subject to any disclaimer, the term of this patent is extended or adjusted under 35 U.S.C. 154(b) by 0 days.

(21) Appl. No.: 14/629,444

(22) Filed: Feb. 23, 2015

(65) Prior Publication Data
US 2015/0244732 A1 Aug. 27, 2015

Related U.S. Application Data

(60) Provisional application No. 61/944,006, filed on Feb. 24, 2014.

(51) Int. Cl.
*G06F 21/56* (2013.01)
*H04L 29/06* (2006.01)

(52) U.S. Cl.
CPC ........ *H04L 63/1416* (2013.01); *G06F 21/561* (2013.01); *G06F 21/564* (2013.01); *H04L 63/145* (2013.01)

(58) Field of Classification Search
None
See application file for complete search history.

(56) References Cited

U.S. PATENT DOCUMENTS 7,418,729 B2   8/2008   Szor
7,540,030 B1   5/2009   Zaitsev
(Continued)

OTHER PUBLICATIONS

Bayer, Ulrich, "TTAnalyze: A Tool for Analyzing Malware", Master's Thesis, Technical University of Vienna, Dec. 12, 2005.
(Continued)

*Primary Examiner* — Trang Doan
(74) *Attorney, Agent, or Firm* — Nixon Peabody LLP (57) ABSTRACT

Systems and methods for monitoring malware events in a computer networking environment are described. The systems and methods including the steps of identifying suspect objects; transmitting the suspect objects to an inspection service, wherein the inspection service inspects the suspect objects using a plurality of inspection methods to create digital information about the nature of the potential threat posed by the suspect objects; transmitting said digital information to an analytical service operating, wherein the analytical service performs a plurality of analytical algorithms to categorize the suspect objects with one or more scores for each suspect object based on their security threat; transmitting said one or more scores to a correlation facility which aggregates a plurality of scores; and generating an infection verification pack comprising routines which, when run on an end-point machine within the computer networking environment, will mitigate a suspected security threat.

7 Claims, 9 Drawing Sheets

(56) References Cited

U.S. PATENT DOCUMENTS

| | | | |
|---|---|---|---|
| 7,664,626 | B1 | 2/2010 | Ferrie |
| 8,060,074 | B2 | 11/2011 | Danford et al. |
| 8,108,912 | B2 | 1/2012 | Ferris |
| 8,151,352 | B1 | 4/2012 | Novitchi |
| 8,176,477 | B2 | 5/2012 | Wu |
| 8,204,984 | B1 | 6/2012 | Aziz et al. |
| 8,266,698 | B1 | 9/2012 | Seshardi et al. |
| 8,375,444 | B2 | 2/2013 | Aziz et al. |
| 8,375,450 | B1 | 2/2013 | Oliver et al. |
| 8,407,797 | B1 | 3/2013 | Novitchi |
| 8,516,589 | B2 | 8/2013 | Jeong et al. |
| 8,751,490 | B1* | 6/2014 | Cooley .............. G06Q 30/0282 707/724 |
| 8,769,683 | B1 | 7/2014 | Oliver |
| 8,984,581 | B2 | 3/2015 | Luna et al. |
| 2005/0081053 | A1 | 4/2005 | Aston et al. |
| 2006/0010440 | A1 | 1/2006 | Anderson et al. |
| 2006/0161982 | A1 | 7/2006 | Chari et al. |
| 2007/0244987 | A1* | 10/2007 | Pedersen ............. H04L 63/0272 709/217 |
| 2007/0250930 | A1 | 10/2007 | Aziz et al. |
| 2008/0086776 | A1 | 4/2008 | Tuvell et al. |
| 2009/0077544 | A1 | 3/2009 | Wu |
| 2010/0064299 | A1 | 3/2010 | Kacin et al. |
| 2010/0115621 | A1 | 5/2010 | Staniford et al. |
| 2010/0192223 | A1 | 7/2010 | Ismael et al. |
| 2011/0041179 | A1* | 2/2011 | Såhlberg ............... G06F 21/566 726/23 |
| 2011/0054879 | A1 | 3/2011 | Bogsanyl et al. |
| 2011/0055123 | A1* | 3/2011 | Kennedy .............. G06N 99/005 706/12 |
| 2011/0145926 | A1 | 6/2011 | Dalcher et al. |
| 2011/0167494 | A1 | 7/2011 | Bowen et al. |
| 2011/0225655 | A1 | 9/2011 | Niemela et al. |
| 2011/0247072 | A1 | 10/2011 | Staniford et al. |
| 2011/0271343 | A1 | 11/2011 | Kim et al. |
| 2011/0302656 | A1 | 12/2011 | El-Moussa |
| 2012/0110672 | A1* | 5/2012 | Judge ...................... H04L 51/12 726/25 |
| 2013/0097706 | A1 | 4/2013 | Titonis et al. |
| 2013/0117848 | A1 | 5/2013 | Golshan et al. |
| 2013/0117849 | A1 | 5/2013 | Golshan et al. |
| 2013/0227691 | A1 | 8/2013 | Aziz et al. |
| 2013/0263260 | A1 | 10/2013 | Mahaffey et al. |
| 2013/0276114 | A1 | 10/2013 | Friedrichs et al. |
| 2013/0298244 | A1 | 11/2013 | Kumar et al. |
| 2013/0318568 | A1 | 11/2013 | Mahaffey et al. |
| 2014/0090061 | A1 | 3/2014 | Avasarala et al. |
| 2014/0096251 | A1* | 4/2014 | Doctor ................ H04L 63/1408 726/23 |
| 2015/0007312 | A1 | 1/2015 | Pidathala et al. |
| 2015/0106927 | A1* | 4/2015 | Ferragut ............. H04L 63/1416 726/23 |
| 2015/0128263 | A1 | 5/2015 | Raugas et al. |
| 2015/0135262 | A1* | 5/2015 | Porat ..................... G06F 21/552 726/1 |
| 2015/0172300 | A1 | 6/2015 | Cochenour |
| 2015/0180883 | A1 | 6/2015 | Aktas et al. |
| 2015/0244730 | A1 | 8/2015 | Vu et al. |
| 2016/0065601 | A1 | 3/2016 | Gong et al. |
| 2016/0078229 | A1 | 3/2016 | Gong et al. |

OTHER PUBLICATIONS

Cavallaro, Lorenzo et al., "Anti-Taint-Analysis: Practical Evasion Techniques Against Information Flow Based Malware Defense", Secure Systems Lab at Stony Brook University, Tech. Rep, pp. 1-18, Nov. 2007.

Chen, Xu et al., "Towards an Understanding of Anti-Virtualization and Anti-Debugging Behavior in Modern Malware," In Proceedings of the 38th Annual IEEE International Conference on Dependable Systems and Networks (DSN), Jun. 24, 2008.

Ho, Alex et al., "Practical Taint-Based Protection Using Demand Emulation", EuroSys '06, Proceedings of the 1st ACM SIGOPS/EuroSys European Conference on Computer Systems 2006, vol. 40, Issue 4, pp. 29-41, Oct. 2006.

Kang, Min Gyung et al., "Emulating Emulation-Resistant Malware," In Proceedings of the Workshop on Virtual Machine Security (VMSec), Nov. 9, 2009.

Zhang, Xiao-Song et al., "A Practical Taint-Based Malware Detection", ICACIA 2008, International Conference on Apperceiving Computing and Intelligence Analysis, pp. 73-77, Dec. 2008.

Extended European Search Report in European Application No. 12844780.2, dated Jul. 22, 2015.

Extended European Search Report in European Application No. 12845692.8, dated Oct. 8, 2015.

International Preliminary Report on Patentability in International Application No. PCT/US2012/063566, mailed May 15, 2014.

International Preliminary Report on Patentability in International Application No. PCT/US2012/063569, mailed May 15, 2014.

International Search Report and Written Opinion in International Application No. PCT/US2012/063566, mailed Jan. 22, 2013.

International Search Report and Written Opinion in International Application No. PCT/US2012/063569, mailed Jan. 18, 2013.

International Search Report and Written Opinion in International Application No. PCT/US2015/017389, mailed Dec. 11, 2015.

International Search Report and Written Opinion in International Application No. PCT/US2015/017394, mailed Jun. 10, 2015.

Office Action in U.S. Appl. No. 13/288,905, mailed mailed May 21, 2013.

Office Action in U.S. Appl. No. 13/288,905, mailed Feb. 19, 2014.
Office Action in U.S. Appl. No. 13/288,905, mailed Oct. 23, 2014.
Office Action in U.S. Appl. No. 13/288,905, mailed Jun. 4, 2015.
Office Action in U.S. Appl. No. 13/288,905, mailed Jan. 20, 2016.
Office Action in U.S. Appl. No. 13/288,917, mailed Sep. 12, 2013.
Office Action in U.S. Appl. No. 13/288,917, mailed Jun. 30, 2014.
Office Action in U.S. Appl. No. 13/288,917, mailed Dec. 3, 2014.
Office Action in U.S. Appl. No. 13/288,917, mailed Jul. 13, 2015.
Office Action in U.S. Appl. No. 14/629,435, mailed Apr. 1, 2016.
Notice of Allowance in U.S. Appl. No. 13/288,905, mailed Aug. 2, 2016.

Office Action in U.S. Appl. No. 13/288,917, mailed Jun. 1, 2016.
Extended European Search Report in European Application No. 16167215.9, dated Sep. 28, 2016.

International Preliminary Report on Patentability in International Application No. PCT/US2015/017389, mailed Sep. 9, 2016.

International Preliminary Report on Patentability in International Application No. PCT/US2015/017394, mailed Sep. 9, 2016.

Office Action in U.S. Appl. No. 14/629,435, mailed Dec. 22, 2016.

\* cited by examiner

SYSTEMS AND METHODS FOR MALWARE DETECTION AND MITIGATION

CROSS-REFERENCE TO RELATED APPLICATIONS

This application claims priority from U.S. Provisional Patent Application No. 61/944,006, filed on Feb. 24, 2014, which is hereby incorporated by reference in its entirety.

This application is related to U.S. patent application Ser. No. 13/288,917, filed Nov. 3, 2011, entitled "Systems and Methods for Virtualized Malware Detection," and U.S. patent application Ser. No. 13/288,905, filed Nov. 3, 2011, entitled "Systems and Methods for Virtualized Malware Detection," both of which are incorporated herein by reference.

TECHNICAL FIELD

This application relates generally to the field of malware detection and mitigation.

BACKGROUND

Security threats to an organization's information systems can have a significant impact on its business goals. Malware and advanced persistent attacks are growing in number as well as damage. In 2010, the rise of targeted attacks included armored variations of Conficker. D and Stuxnet (which was referred to as the most advanced piece of malware ever created). Targeted attacks on Google, Intel, Adobe, Boeing, and an estimated 60 others have been extensively covered in the press. The state of the art security defenses have proved ineffective.

Cyber-criminals conduct methodical reconnaissance of potential victims to identify traffic patterns and existing defenses. Very sophisticated attacks involve multiple "agents" that individually appear to be legitimate traffic, then remain persistent in the target's network. The arrival of other agents may also be undetected, but when all are in the target network, these agents can work together to compromise security and steal targeted information.

Ways need to be found to better mitigate new attacks, identify compromised systems, reduce resolution time, and lower resolution cost. The coverage, context, and cost of current solutions may prevent customers from achieving those objectives. One approach has been the use of rigid hardware based solutions. This makes multi-site deployments impractical, and provides no protection for virtual and cloud infrastructures. Armoring can defeat first generation sandbox-based solutions.

In terms of context, legacy security solutions typically use a structured process (e.g., signature and heuristics matching) or analyze agent behavior in an isolated context, without the ability to detect future coordinated activity. These legacy solutions increase time to resolution. They produce an overload of alerts with an inability to effectively prioritize threads. The intelligence they provide is therefore often not actionable. Furthermore, legacy security solutions are not able to detect sophisticated malware that is armored, multi-component based delivery, and/or includes different forms of delayed execution.

Legacy solutions are also overpriced because their means of triage and mitigation is inefficient, and relies on overprovisioned appliances. In many implementations, they can consume up to 20-30% of an organization's security budget.

SUMMARY

Systems and methods for monitoring malware events in a computer networking environment are described. The systems and methods including the steps of identifying a plurality of suspect objects comprising data about network transactions or computer operations suspected of being linked to a security risk; transmitting the suspect objects to an inspection service operating on one or more general purpose digital computers, wherein the inspection service inspects the suspect objects using a plurality of inspection methods to create digital information about the nature of the potential threat posed by the suspect objects; transmitting said digital information to an analytical service operating on one or more general purpose digital computers, wherein the analytical service performs a plurality of analytical algorithms to categorize the suspect objects with one or more scores for each suspect object based on their security threat; transmitting said one or more scores to a correlation facility which aggregates a plurality of scores, optionally with other information about each suspect objects, into the form of aggregate data representing one or more aggregate features of a plurality of suspect objects; and generating an infection verification pack (IVP) comprising routines which, when run on an end-point machine within the computer networking environment, will mitigate a suspected security threat.

Other features and advantages of embodiments will be apparent from the accompanying drawings and from the detailed description that follows.

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted, based on this disclosure, in view of the common knowledge within this field.

In the drawings.

DETAILED DESCRIPTION

Various examples and descriptions are provided below in order to illustrate embodiments of the claimed inventions. Not all of the routine, obvious, or inherent features of the examples described herein are shown. Those that are should not be construed as limiting the scope of the claimed inventions. In the development of any such actual implementation, numerous implementation-specific decisions must be made in order to achieve the specific goals of the developer, and that these specific goals will vary from one implementation to another and from one developer to another. Moreover, such a developmental effort might be complex and time-consuming, but would nevertheless be a routine undertaking of engineering for those of ordinary skill in the art having the benefit of this disclosure.

Throughout the present disclosure, relevant terms are to be understood consistently with their typical meanings established in the relevant art.

Figure 1:
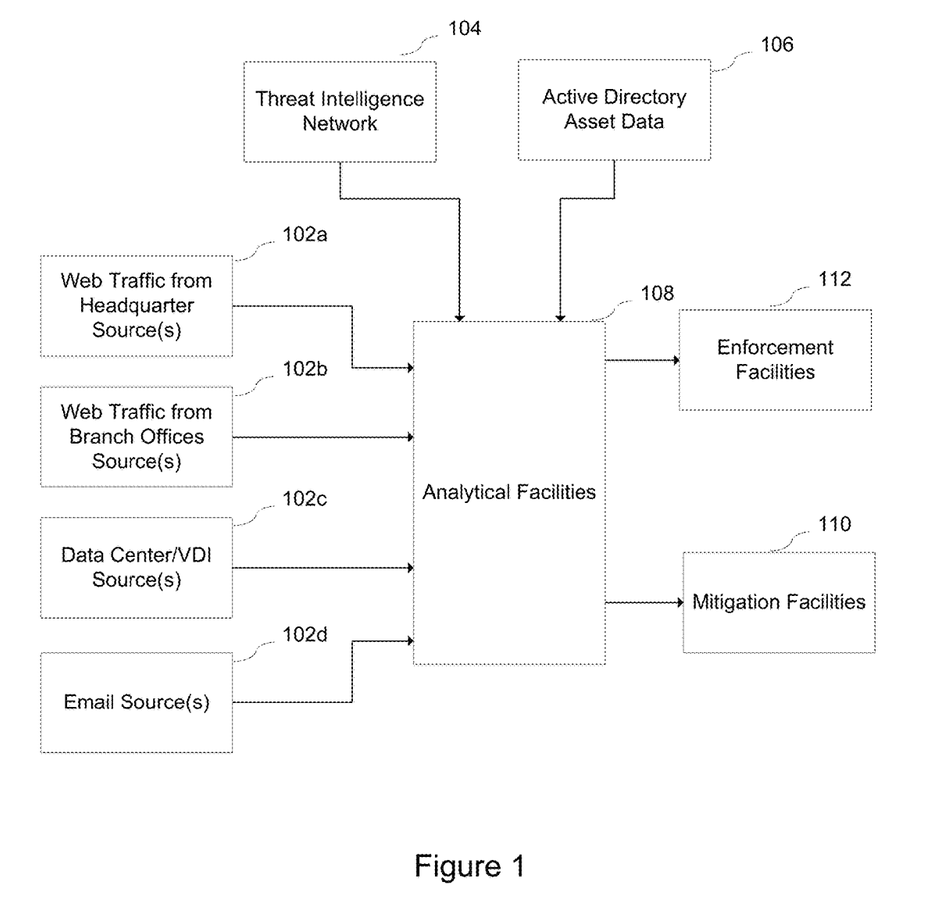
FIG. 1 is a diagram illustrating a system and method for collecting data about malware, analyzing that data, and mitigating the malware according to an embodiment.

FIG. 1 illustrates an embodiment of a system for detecting and mitigating malware. On the left side, it shows facilities for distributed collection of information about suspected malware. The type of information to be collected may include, for example, malware-related files and objects, as well as metadata, such as chains of URLs leading to the download, and email to which the files are attached, etc., in addition to general command and control and other attack activities.

Data may be collected from many sources 102a-d, including web traffic at the organization's headquarters 102a and from branch offices 102b. The collected data may also include data collected from data centers and virtual desktop infrastructures (VDIs) 102c. Web data may for example be obtained by packet capture, TCP reassembly, and/or HTTP parsing. Further data may be collected from email sent to or from the organization. For example, data may be collected from email used by Office 365, Microsoft Exchange, or Google Gmail. Additional data may be collected from files located on servers or clients within the organization. Such files may, for example, be inspected when they are copied or transferred between locations, when they are installed on a computer, or through some kind of end-point protection that monitors changes in files on a disk. Further potential malware data may be obtained from the security systems of a network or an individual computer or other device.

Any data about suspected malware from any of these sources, or any other sources available to the organization may be sent to a set of analytical facilities 108, such as a core malware detection facility. These facilities may analyze the data using several different alternative or complementary methods. This analysis may use information about malware from a threat network 104, from directories of known malware (such as an active directory asset data 106), from third-party sources, etc. Statistical and probabilistic methods may be used to inspect, analyze, and correlate the suspected malware data.

Based on the conclusions of the analytical facilities 108, the system may provide mitigation facilities 110. These facilities may for example take the form of infection verification packs (IVPs) that may be used at suspected infection sites to verify and/or mitigate an infection. It may also include enforcement facility 112 that receives and implements sets of malware mitigation rules that may be used to mitigate existing infections or prevent future infections from the network. If possible, threats may be mitigated before a breach happens.

In one embodiment, the above system may be implemented using a multi-platform distributed network, such as a cloud-based network of servers. The system may use many complementary or redundant methods for detecting suspected malware. The system may include facilities for prioritizing suspected threats based on seriousness, urgency, and/or potential damage. The system should ideally use an organization's existing network controls, and not require extensive training or operating expense.

Figure 2:
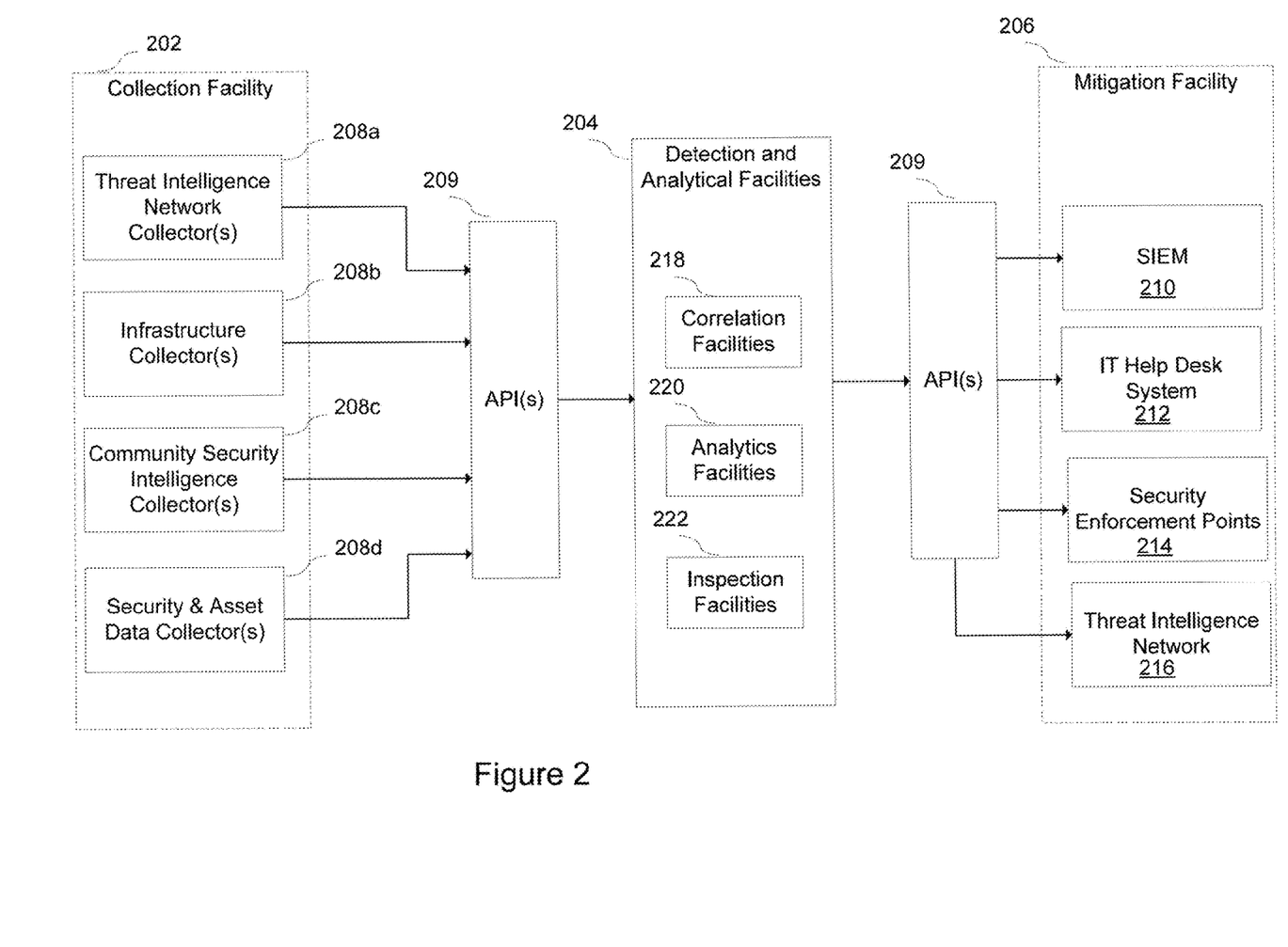
FIG. 2 is a diagram illustrating a security detection and analysis ecosystem according to an embodiment.

FIG. 2 is an illustration of a security detection and analysis ecosystem according to an embodiment which shows some of the components of the collection, detection and analytics, and mitigation parts of the system. The collection facilities 202 may include collectors 208a-d at various locations, community security intelligence, and security and asset data from the local environment. The collection facilities 202 and the collectors 208a-d may be coupled with a detection and analytical facility 204 through one or more application programing interfaces (API) 209. The detection and analytical facilities 204 may include facilities for correlation 218, analytics 220, and inspection 222. The detection and analytical facility 204 may be coupled with a mitigation facility through one or more APIs 209. The mitigation facilities 206 may include various software or organizational tools such as security information and event management (SIEM) software 210, an information technology (IT) help desk system 212, security enforcement points 214, and a threat network 216 that may provide shared security information among different organizations.

Figure 3:
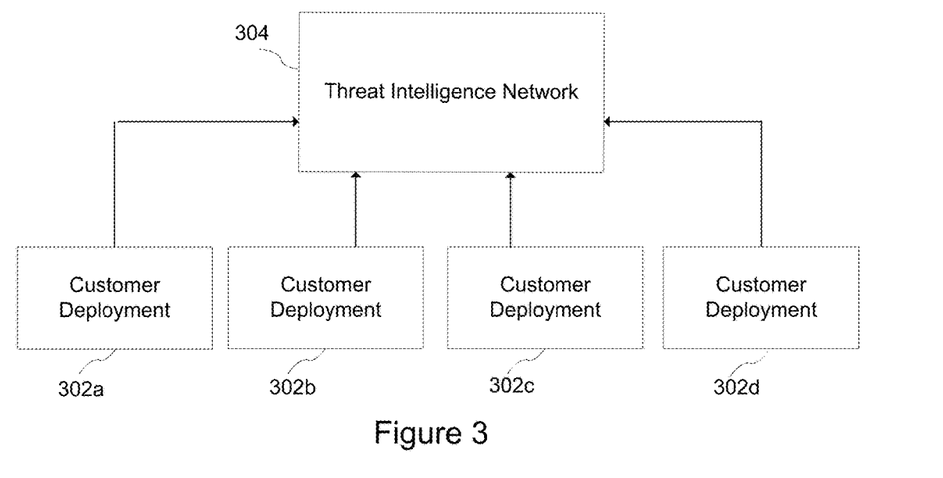
FIG. 3 is a diagram illustrating a multi-customer deployment connected to a threat intelligence network according to an embodiment.

FIG. 3 illustrates a multi-customer deployment connected to a threat intelligence network according to an embodiment. Customers benefit from the sharing of threat intelligence through a threat intelligence network 304. As illustrated here, this network may take the form of a cloud-based service with connections to multiple organizations. Through this network, these organizations, will receive machine learning model updates, ongoing threat intelligence, or static analysis updates, etc. By the choice of these organizations, the intelligence data collected from these organizations can also be shared amongst themselves through the network.

Figure 4:
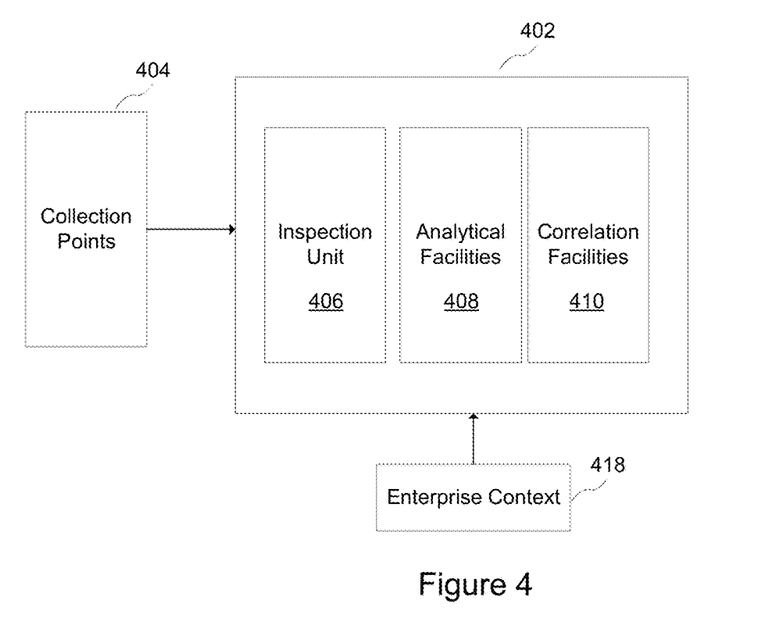
FIG. 4 is a diagram illustrating an analytical core in relation to sources of information and targets for mitigation.

FIG. 4 shows an example analytical core 402 as it relates to sources of information, detection, and mitigation functions. Data about suspect objects, such as command and control traffic, may arrive at the core from various collection points 404, such as one or more sources/collectors, within or outside the organization. In one embodiment, command and control traffic may be continuously monitored for persistent threats. The analytical core 402 also receives enterprise context 418. Enterprise context includes, but is not limited to, user and group information/settings, and asset value and protection (e.g., antivirus product) settings.

This data may be inspected by an inspection unit 406. Prior to inspection, or as part of inspection, suspect objects may be subject to reputation filtering, wherein suspect objects are compared to a database of objects which have been previously scored by their reputation among users of end-point machines who have used or executed the objects. Such scores may for example be based on data collected by the systems described in this disclosure, or from third-party sources.

Inspection may include the use of multiple inspection methods, to create digital information about the nature of the potential threat posed by the suspect objects. For example, a suspect object may be instantiated and executed within a sandbox within a virtualized environment, so that its behavior may be inspected in a safe environment that will not infect other machines. The suspect objects may also be instantiated and executed in an emulation environment. In one embodiment, the object may be instantiated and executed in both virtualized and emulation environments, and the results may be compared. Virtualized and emulated environments for malware inspection are described in U.S. patent application Ser. Nos. 13/288,917 and 13/288,905, which are incorporated herein.

Inspection may also take the form of static inspection, where a suspect object is inspected to identify signatures of known malware. Several methods of performing such static analysis are known in the art. In addition, the inspection facility may look for command and control patterns in network communication.

After inspection, suspect malware may be subject to analytical facilities 408 which may include machine learning and chain playback. This analysis may draw upon information from a multi-organizational threat network, and from information about the enterprise context of an organization. In one embodiment, the analytical facilities may score suspect objects, or combinations of suspect objects, based on their security threats. The score may, for example, be a determination that a particular source of data is clean, that it is malware, or that it is suspicious.

Several analytical methods may be used, either individually or in combination. For example, the analytical framework may obtain scores based on a hierarchical reasoning model (HRE), or Bayesian network, which assesses the probability that a suspect object or group of objects is malware. Such an HRE may be constructed by hand, or may for example be the result of tuning by machine learning systems. In one embodiment, a plurality of different models may be used.

In another embodiment, scores may be obtained using linear classifiers based on a plurality of feature values, each feature value representing a characteristic of one or more suspect objects. For example, the LIBLINEAR library may be used to construct linear classifiers based on sets of feature values derived from various sources.

In another embodiment, the analytical facilities 408 may include classifying suspect objects on the basis of pre-defined heuristics. These heuristics may be created by hand based on experience, or derived from security research. They may also be derived from security data based on machine learning algorithms.

Analysis may take place in real time, based on suspect object data as it comes in from the collectors, or it make take place off-line. Off-line analyses may, for example, be used to perform deep, computing-intensive analysis on large amounts of data. The results are then fed back into the classification models.

After analysis, data may pass through correlation facilities 410. These facilities take analytical data from multiple sources and aggregate or correlate this data. Based on such correlations, the system may obtain relevant actionable intelligence that may be used for mitigation. The correlation facilities may assess the severity of threats, the intent of the attack or the intended targets. It may group security events together by context and identify kill chains. The system provides detection including, but not limited to, 0-day, targeted, persistent, sandbox, and time-lag evasion, adaptive, encrypted, and obfuscated. Further, the system provides context aware mitigation including, but not limited to, risk based prioritization, infection verification pack, and mitigation rules. The system also provides coverage including, but not limited to, across the enterprise (customer deployment), across e-mail and web applications, across Windows®, MAC OSX, and Linux.

Figure 5:
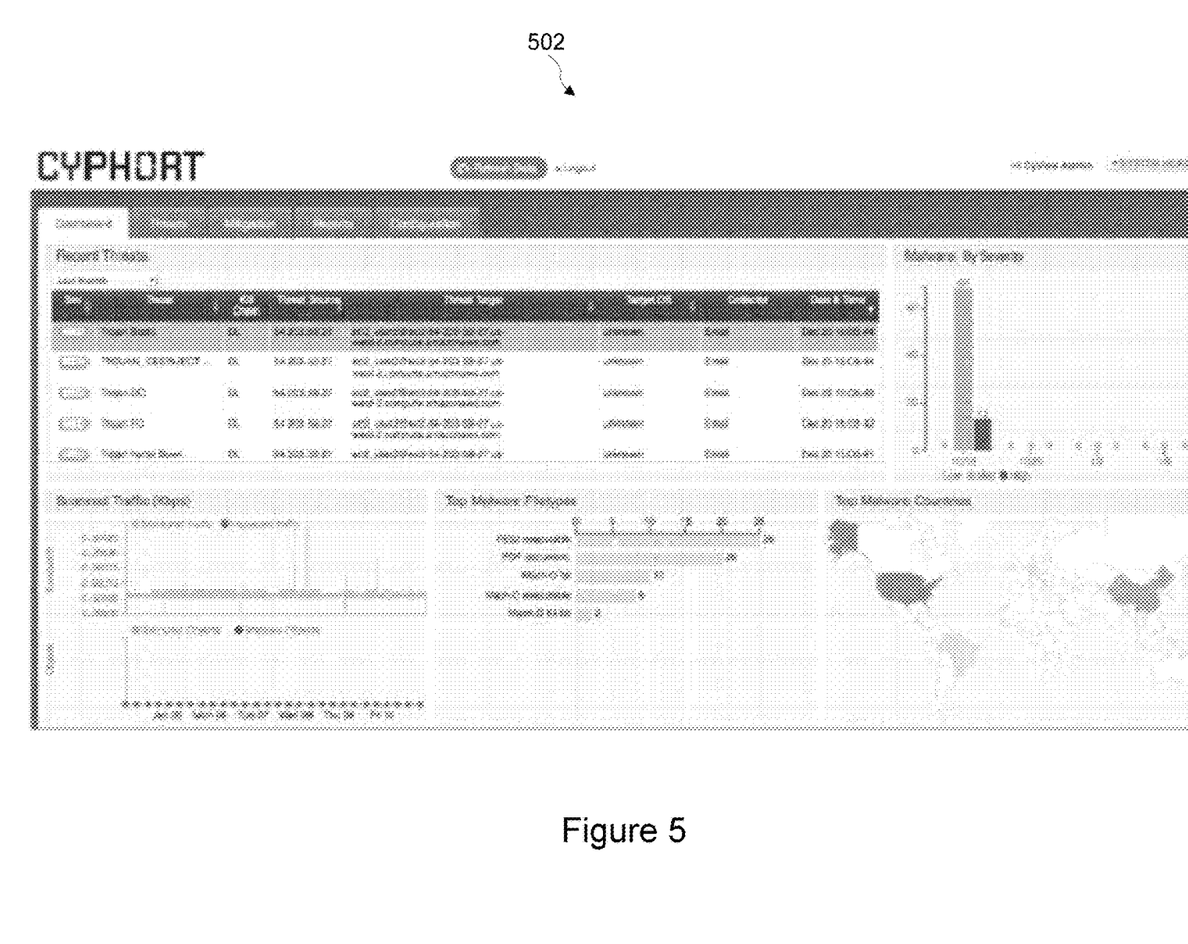
FIG. 5 is a screen shot illustrating an example application for visualizing security data.

FIG. 5 is a screen shot showing an embodiment of a software user interface 502 for conveying malware threat information to a user or IT security administrator.

Figure 6:
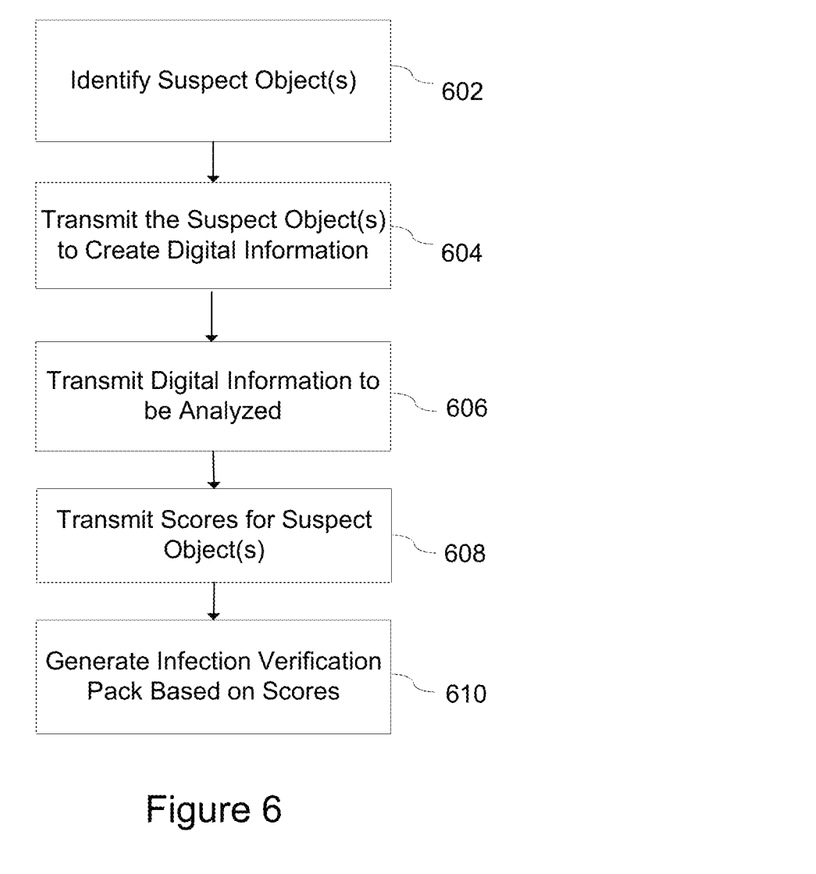
FIG. 6 illustrates a flow diagram of a method for monitoring malware events in a computer networking environment according to an embodiment.

FIG. 6 illustrates a flow diagram of a method for monitoring malware events in a computer networking environment according to an embodiment. The method includes the steps of: (a) identifying a plurality of suspect objects (602) comprising data about network transactions or computer operations suspected of being linked to a security risk; (b) transmitting the suspect objects (604) along with metadata to an inspection service operating on one or more general purpose digital computers, wherein the inspection service inspects the suspect objects using a plurality of inspection methods to create digital information about the nature of the potential threat posed by the suspect objects; (c) transmitting said digital information to an analytical service (606) operating on one or more general purpose digital computers, wherein the analytical service performs a plurality of analytical algorithms to categorize the suspect objects with one or more scores for each suspect object based on their security threat; (d) transmitting said one or more scores (608) to a correlation facility which aggregates a plurality of scores, optionally with other information about each suspect objects, into the form of aggregate data representing one or more aggregate features of a plurality of suspect objects; and (e) generating an infection verification pack (IVP) (610) comprising routines which, when run on an end-point machine within the computer networking environment, will mitigate a suspected security threat.

Figure 7:
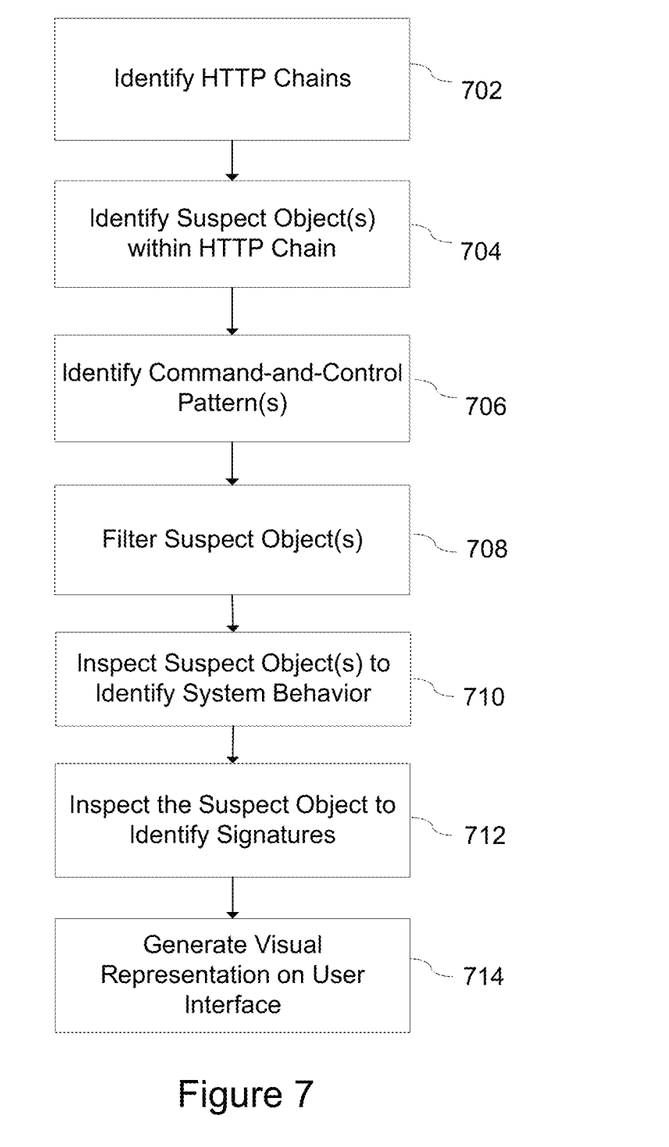
FIG. 7 illustrates a flow diagram of a method for correlating information about a kill chain for an advanced persistent threat (APT) taking place in a computer networking environment according to an embodiment.

FIG. 7 illustrates a flow diagram of a method for correlating information about a kill chain for an advanced persistent threat (APT) taking place in a computer networking environment according to an embodiment. The method includes the steps of: (a) identifying HTTP chains (702) indicating a drive-by infection sequence; (b) identifying a plurality of suspect objects (704) comprising events within the kill chain for an APT within the networking environment; (c) identifying command-and-control patterns (706) which are part of said kill chain; (d) filtering the suspect objects (708) based on reputation filtering, wherein the suspect objects are compared to a database of objects which have been previously scored by their reputation among a plurality of users of end-point machines who have used or executed the objects; (e) inspecting the suspect object (710) in a virtualized and/or emulated environment to identify system behavior that characterizes them as likely malware, (f) inspecting the suspect object (712) statically to identify signatures of known malware; and (g) generating a visual representation on a user interface (714) of the nature of the APT while the APT is in progress. This visual representation may, in one embodiment, include the following information: spear-phishing by email, if present; drive-by Java web attacks, if present; malware downloads, if present; malware system behavior during execution, if present; and/or malware command and control callbacks indicating the infection and the presence of additional risky or malicious network activities, such as suspicious data movement.

Figure 8:
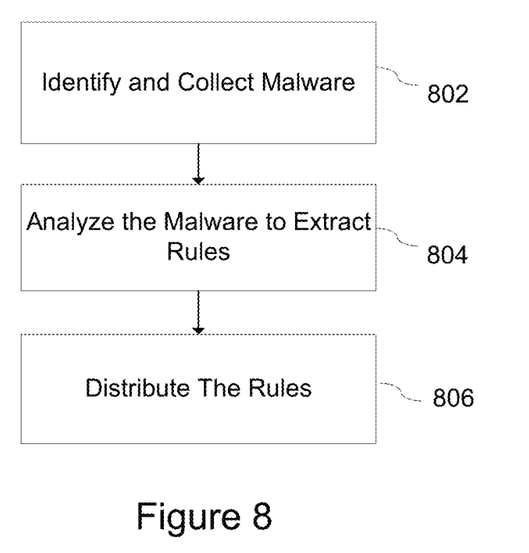
FIG. 8 illustrates a flow diagram of a method for identification of emerging threats and spread assessment according to an embodiment

In another embodiment, a network-centric framework may be provided for identification of emerging threats and spread assessment. This framework may include architecture which streamlines the malware collection, malware analysis, malware command and control rule generation, and malware command-and-control detection solution deployment. An example method for accomplishing this, as illustrated in FIG. 8, includes: (a) identifying and collecting the most prevalent malware in the wild (802), (b) using an automatic system to analyze the malware to extract rules for detecting command-and-control patterns (804) and (d) distribute the rules to the detection system that utilize command-and-control signatures (806).

In another embodiment, supervised machine learning can be used to detect suspicious patterns in application transactions. Users can, in one embodiment, define assets or transactions to be protected, and provide supervision input for machine learning. Real-time threat intelligence and local anomalies may be correlated to provide information such as (a) full threat situation awareness, (b) what threats happened, (c) how far particular threats have progressed, and/or (d) whether any data exfiltration has occurred.

Figure 9:
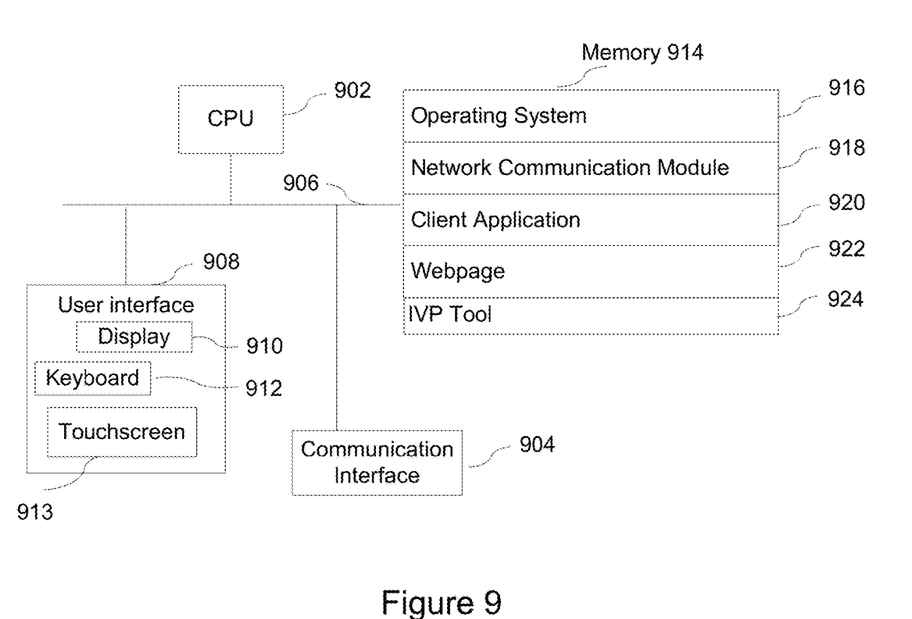
FIG. 9 illustrates an embodiment of a client according to an embodiment.

FIG. 9 illustrates an embodiment of a client, user device, client machine, or digital device one or more of which is used in a customer deployment to implement on or more of the techniques described herein that includes one or more processing units (CPUs) 902, one or more network or other communications interfaces 904, memory 914, and one or more communication buses 906 for interconnecting these components. The client may include a user interface 908 comprising a display device 910, a keyboard 912, a touchscreen 913 and/or other input/output device. Memory 914 may include high speed random access memory and may also include non-volatile memory, such as one or more magnetic or optical storage disks. The memory 914 may include mass storage that is remotely located from CPUs 902. Moreover, memory 914, or alternatively one or more storage devices (e.g., one or more nonvolatile storage devices) within memory 914, includes a computer readable storage medium. The memory 914 may store the following elements, or a subset or superset of such elements:

- an operating system 916 that includes procedures for handling various basic system services and for performing hardware dependent tasks;
- a network communication module 918 (or instructions) that is used for connecting the client to other computers, clients, servers, systems or devices via the one or more communications network interfaces 904 and one or more communications networks, such as the Internet, other wide area networks, local area networks, metropolitan area networks, and other type of networks; and
- a client application 920 including, but not limited to, a web browser, a document viewer or other application for viewing information;
- a webpage 922 including one generated by the client application 920 configured to receive a user input to communicate with across a network with other computers or devices; and
- an IVP tool 924 to perform one or more aspects of an IVP system as described herein.

According to an embodiment, the client may be any device that includes, but is not limited to, a mobile phone, a computer, a tablet computer, a personal digital assistant (PDA) or other mobile device.

Figure 10:
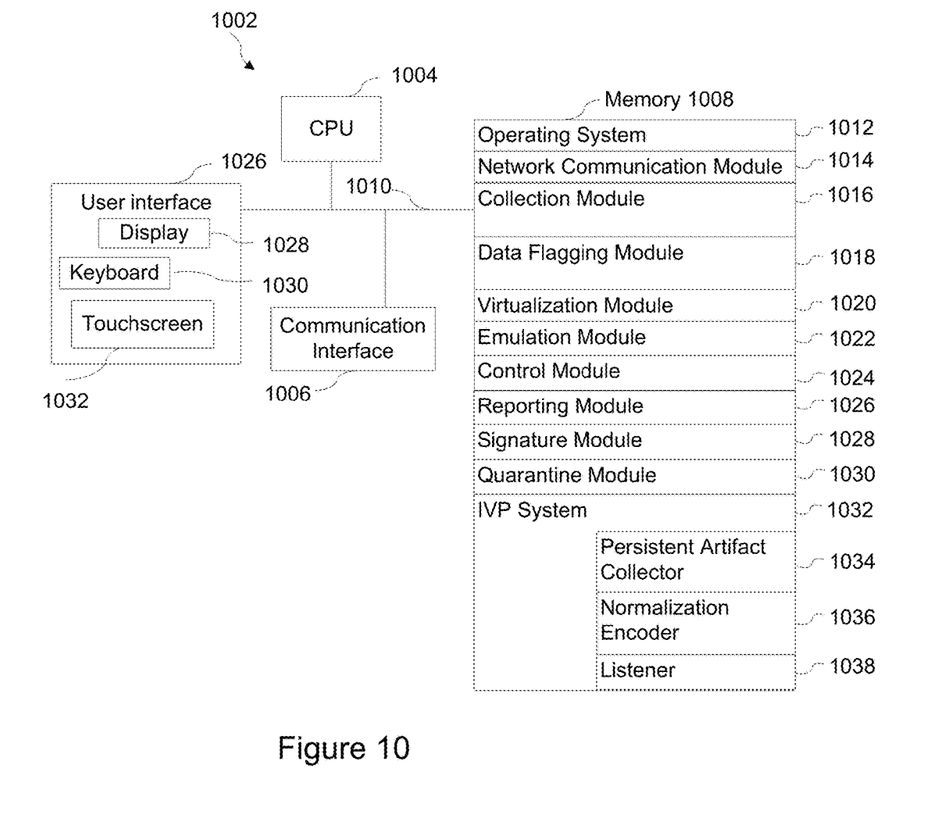
FIG. 10 illustrates an embodiment of a system for detecting malware according to an embodiment.

FIG. 10 illustrates an embodiment of a server, such as a system that implements the methods described herein. The system, according to an embodiment, includes one or more processing units (CPUs) 1004, one or more communication interface 1006, memory 1008, and one or more communication buses 1010 for interconnecting these components. The system 1002 may optionally include a user interface 1026 comprising a display device 1028, a keyboard 1030, a touchscreen 1032, and/or other input/output devices. Memory 1008 may include high speed random access memory and may also include non-volatile memory, such as one or more magnetic or optical storage disks. The memory 1008 may include mass storage that is remotely located from CPUs 1004. Moreover, memory 1008, or alternatively one or more storage devices (e.g., one or more nonvolatile storage devices) within memory 1008, includes a computer readable storage medium. The memory 1008 may store the following elements, or a subset or superset of such elements: an operating system 1012, a network communication module 1014, a collection module 1016, a data flagging module 1018, a virtualization module 1020, an emulation module 1022, a control module 1024, a reporting module 1026, a signature module 1028, a quarantine module 1030, a IVP System 1032, a persistent artifact collector 1034, a normalization encoder 1036, and a listener 1038. An operating system 1012 that includes procedures for handling various basic system services and for performing hardware dependent tasks. A network communication module 1014 (or instructions) that is used for connecting the system to other computers, clients, peers, systems or devices via the one or more communication network interfaces 1006 and one or more communication networks, such as the Internet, other wide area networks, local area networks, metropolitan area networks, and other type of networks.

A collection module 1016 (or instructions) for inspecting objects for potentially malware-carrying objects. Further, the collection module 1016 is configured to receive network data (e.g., potentially suspicious data) from one or more sources. Network data is data that is provided on a network from one digital device to another. The collection module 1016 may flag the network data as suspicious data based on, for example, whitelists, blacklists, heuristic analysis, statistical analysis, rules, and/or atypical behavior. In some embodiments, the sources comprise data collectors configured to receive network data. For example, firewalls, IPS, servers, routers, switches, access points and the like may, either individually or collectively, function as or include a data collector. The data collector may forward network data to the collection module 1016.

In some embodiments, the data collectors filter the data before providing the data to the collection module 1016. For example, the data collector may be configured to collect or intercept data that includes executables and batch files. In some embodiments, the data collector may be configured to follow configured rules. For example, if data is directed between two known and trustworthy sources (e.g., the data is communicated between two device on a whitelist), the data collector may not collect the data. In various embodiments, a rule may be configured to intercept a class of data (e.g., all MS Word® documents that may include macros or data that may comprise a script). In some embodiments, rules may be configured to target a class of attack or payload based on the type of malware attacks on the target network in the past. In some embodiments, the system may make recommendations (e.g., via the reporting module 1026) and/or configure rules for the collection module 1016 and/or the data collectors. Those skilled in the art will appreciate that the data collectors may comprise any number of rules regarding when data is collected or what data is collected.

In some embodiments, the data collectors located at various positions in the network may not perform any assessment or determination regarding whether the collected data is suspicious or trustworthy. For example, the data collector may collect all or a portion of the network data and provide the collected network data to the collection module 1016 which may perform filtering.

A data flagging module 1018 (or instructions) may perform one or more assessments to the collected data received by the collection module 1016 and/or the data collector to determine if the intercepted network data is suspicious. The data flagging module 1018 may apply rules using techniques including those known in the art to determine if the collected data should be flagged as suspicious. In various embodiments, the data flagging module 1018 may hash the data and/or compare the data to a whitelist to identify the data as acceptable. If the data is not associated with the whitelist, the data flagging module 1018 may flag the data as suspicious.

In various embodiments, collected network data may be initially identified as suspicious until determined otherwise (e.g., associated with a whitelist) or heuristics find no reason that the network data should be flagged as suspicious. In some embodiments, the data flagging module 1018 may perform packet analysis to look for suspicious characteristics in the header, footer, destination IP, origin IP, payload, and the like. Those skilled in the art will appreciate that the data flagging module 1018 may perform a heuristic analysis, a statistical analysis, and/or signature identification (e.g., signature-based detection involves searching for known patterns of suspicious data within the collected data's code) to determine if the collected network data is suspicious.

The data flagging module 1018 may be resident at the data collector, at the system, partially at the data collector, partially at a security server or facility as describe herein, or on a network device. For example, a router may comprise a data collector and a data flagging module 1018 configured to perform one or more heuristic assessments on the collected network data. If the collected network data is determined to be suspicious, the router may direct the collected data to the security server.

In various embodiments, the data flagging module 1018 may be updated. In one example, the security server or facility as described herein may provide new entries for a whitelist, entries for a blacklist, heuristic algorithms, statistical algorithms, updated rules, and/or new signatures to assist the data flagging module 1018 to determine if network data is suspicious. The whitelists, entries for whitelists, blacklists, entries for blacklists, heuristic algorithms, statistical algorithms, and/or new signatures may be generated by one or more security servers or facility as described herein (e.g., via the reporting module 1026).

The virtualization module 1020 and emulation module 1022 may analyze suspicious data for untrusted behavior (e.g., malware, distributed attacks, detonation). The virtualization module 1020 is configured to instantiate one or more virtualized environments to process and monitor suspicious data. Within the virtualization environment, the suspicious data may operate as if within a target digital device. The virtualization module 1020 may monitor the operations of the suspicious data within the virtualization environment to determine that the suspicious data is probably trustworthy, malware, or requiring further action (e.g., further monitoring in one or more other virtualization environments and/or monitoring within one or more emulation environments). In various embodiments, the virtualization module 1020 monitors modifications to a system, checks outbound calls, and checks tainted data interactions.

In some embodiments, the virtualization module 1020 may determine that suspicious data is malware but continue to process the suspicious data to generate a full picture of the malware, identify the vector of attack, determine the type, extent, and scope of the malware's payload, determine the target of the attack, and detect if the malware is to work with any other malware. In this way, the security server or facility as described herein may extend predictive analysis to actual applications for complete validation. A report may be generated (e.g., by the reporting module 1026) describing the malware, identify vulnerabilities, generate or update signatures for the malware, generate or update heuristics or statistics for malware detection, and/or generate a report identifying the targeted information (e.g., credit card numbers, passwords, or personal information).

In some embodiments, the virtualization module 1020 may flag suspicious data as requiring further emulation and analytics in the back end if the data has suspicious behavior such as, but not limited to, preparing an executable that is not executed, performing functions without result, processing that suddenly terminates, loading data into memory that is not accessed or otherwise executed, scanning ports, or checking in specific portions of memory when those locations in memory may be empty. The virtualization module 1020 may monitor the operations performed by or for the suspicious data and perform a variety of checks to determine if the suspicious data is behaving in a suspicious manner.

The emulation module 1022 is configured to process suspicious data in an emulated environment. Those skilled in the art will appreciate that malware may require resources that are not available or may detect a virtualized environment. When malware requires unavailable resources, the malware may "go benign" or act in a non-harmful manner. In another example, malware may detect a virtualized environment by scanning for specific files and/or memory necessary for hypervisor, kernel, or other virtualization data to execute. If malware scans portions of its environment and determines that a virtualization environment may be running, the malware may "go benign" and either terminate or perform nonthreatening functions.

In some embodiments, the emulation module 1022 processes data flagged as behaving suspiciously by the virtualization environment. The emulation module 1022 may process the suspicious data in a bare metal environment where the suspicious data may have direct memory access. The behavior of the suspicious data as well as the behavior of the emulation environment may be monitored and/or logged to track the suspicious data's operations. For example, the emulation module 1022 may track what resources (e.g., applications and/or operating system files) are called in processing the suspicious data.

In various embodiments, the emulation module 1022 records responses to the suspicious data in the emulation environment. If a divergence in the operations of the suspicious data between the virtualization environment and the emulation environment is detected, the virtualization environment may be configured to inject the response from the emulation environment. The suspicious data may receive the expected response within the virtualization environment and continue to operate as if the suspicious data was within the targeted digital device.

A control module 1024 (or instructions) control module 1024 synchronizes the virtualization module 1020 and the emulation module 1022. In some embodiments, the control module 1024 synchronizes the virtualization and emulation environments. For example, the control module 1024 may direct the virtualization module 1020 to instantiate a plurality of different virtualization environments with different resources. The control module 1024 may compare the operations of different virtualization environments to each other in order to track points of divergence. For example, the control module 1024 may identify suspicious data as operating in one manner when the virtualization environment includes, but is not limited to, Internet Explorer v. 7.0 or v. 8.0, but operating in a different manner when interacting with Internet Explorer v. 6.0 (e.g., when the suspicious data exploits a vulnerability that may be present in one version of an application but not present in another version).

The control module 1024 may track operations in one or more virtualization environments and one or more emulation environments. For example, the control module 1024 may identify when the suspicious data behaves differently in a virtualization environment in comparison with an emulation environment. Divergence and correlation analysis is when operations performed by or for suspicious data in a virtual environment is compared to operations performed by or for suspicious data in a different virtual environment or emulation environment. For example, the control module 1024 may compare monitored steps of suspicious data in a virtual environment to monitored steps of the same suspicious data in an emulation environment. The functions or steps of or for the suspicious data may be similar but suddenly diverge. In one example, the suspicious data may have not detected evidence of a virtual environment in the emulation environment and, unlike the virtualized environment where the suspicious data went benign, the suspicious data undertakes actions characteristic of malware (e.g., hijacks a formerly trusted data or processes).

When divergence is detected, the control module 1024 may re-provision or instantiate a virtualization environment with information from the emulation environment (e.g., a page table including state information and/or response information further described herein) that may not be previously present in the originally instantiation of the virtualization environment. The suspicious data may then be monitored in the new virtualization environment to further detect suspicious behavior or untrusted behavior. Those skilled in the art will appreciate that suspicious behavior of an object is behavior that may be untrusted or malicious. Untrusted behavior is behavior that indicates a significant threat.

In some embodiments, the control module 1024 is configured to compare the operations of each virtualized environment in order to identify suspicious or untrusted behavior. For example, if the suspicious data takes different operations depending on the version of a browser or other specific resource when compared to other virtualized environments, the control module 1024 may identify the suspicious data as malware. Once the control module 1024 identifies the suspicious data as malware or otherwise untrusted, the control module 1024 may continue to monitor the virtualized environment to determine the vector of attack of the malware, the payload of the malware, and the target (e.g., control of the digital device, password access, credit card information access, and/or ability to install a bot, keylogger, and/or rootkit). For example, the operations performed by and/or for the suspicious data may be monitored in order to further identify the malware, determine untrusted acts, and log the effect or probable effect.

A reporting module 1026 (or instructions) is configured to generate a data model based on a generated list of events. Further a reporting module 1026 is configured to generate reports based on the processing of the suspicious data of the virtualization module 1020 and/or the emulation module 1022. In various embodiments, the reporting module 1026 generates a report to identify malware, one or more vectors of attack, one or more payloads, target of valuable data, vulnerabilities, command and control protocols, and/or behaviors that are characteristics of the malware. The reporting module 1026 may also make recommendations to safeguard information based on the attack (e.g., move credit card information to a different digital device, require additional security such as VPN access only, or the like).

In some embodiments, the reporting module 1026 generates malware information that may be used to identify malware or suspicious behavior. For example, the reporting module 1026 may generate malware information based on the monitored information of the virtualization environment. The malware information may include a hash of the suspicious data or a characteristic of the operations of or for the suspicious data. In one example, the malware information may identify a class of suspicious behavior as being one or more steps being performed by or for suspicious data at specific times. As a result, suspicious data and/or malware may be identified based on the malware information without virtualizing or emulating an entire attack.

A signature module 1028 (or instructions) is configured to classify said chain of a plurality of hypertext transfer objects based on said list of events. Further a signature module 1028 is configured to store signature files that may be used to identify malware. The signature files may be generated by the reporting module 312 and/or the signature module 1028. In various embodiments, the security server may generate signatures, malware information, whitelist entries, and/or blacklist entries to share with other security servers. As a result, the signature module 1028 may include signatures generated by other security servers or other digital devices. Those skilled in the art will appreciate that the signature module 1028 may include signatures generated from a variety of different sources including, but not limited to, other security firms, antivirus companies, and/or other third-parties.

In various embodiments, the signature module 1028 may provide signatures which are used to determine if network data is suspicious or is malware. For example, if network data matches the signature of known malware, then the network data may be classified as malware. If network data matches a signature that is suspicious, then the network data may be flagged as suspicious data. The malware and/or the suspicious data may be processed within a virtualization environment and/or the emulation environment as discussed herein.

A quarantine module 1030 (or instructions) is configured to quarantine suspicious data and/or network data. In various embodiments, when the security server identifies malware or probable malware, the quarantine module 1030 may quarantine the suspicious data, network data, and/or any data associated with the suspicious data and/or network data. For example, the quarantine module 1030 may quarantine all data from a particular digital device that has been identified as being infected or possibly infected. In some embodiments, the quarantine module 1030 is configured to alert a security administrator or the like (e.g., via email, call, voicemail, or SMS text message) when malware or possible malware has been found.

An IVP system 1032 which includes, but is not limited to, a persistent artifact collector 1034 configured to detect and/or collect artifact information of malware, a normalization encoder 1036 configured to transform and/or filter out artifacts that would not be a good indicator of malware, and a listener 1038, as described herein. The IVP system also includes one or more IVP tools deployed to a client machine in a network environment as described herein. The IVP system 1034 for applying one or more algorithms to behavior traces of the malware object to select one or more persistent artifacts from the infection of this malware on the target system; transforming the one or more persistent artifacts into a form that can be used to verify and detect infection by this malware of a number of endpoint systems with different operating systems and software versions; and incorporating into a program one or more algorithms which when run on any endpoint system along with the transformed artifacts (IVP input), will produce a "confirmed" or "unconfirmed" output using techniques including those described herein.

Although FIG. 10 illustrates system 1002 as a computer it could be distributed system, such as a server system. The figures are intended more as functional descriptions of the various features which may be present in a client and a set of servers than as a structural schematic of the embodiments described herein. As such, one of ordinary skill in the art would understand that items shown separately could be combined and some items could be separated. For example, some items illustrated as separate modules in FIG. 4 could be implemented on a single server or client and single items could be implemented by one or more servers or clients. The actual number of servers, clients, or modules used to implement a system 1002 and how features are allocated among them will vary from one implementation to another, and may depend in part on the amount of data traffic that the system must handle during peak usage periods as well as during average usage periods. In addition, some modules or functions of modules illustrated in FIG. 10 may be implemented on one or more one or more systems remotely located from other systems that implement other modules or functions of modules illustrated in FIG. 10.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A method for monitoring malware events in a computer networking environment, comprising the steps of:
    identifying a plurality of suspect objects including data about network transactions or computer operations suspected of being linked to a security risk;
    transmitting the plurality of suspect objects to an inspection service operating on one or more general purpose digital computers;
    inspecting the plurality of suspect objects using a plurality of inspection methods to create digital information about the nature of the potential threat posed by the plurality of suspect objects;
    transmitting said digital information to an analytical service operating on one or more general purpose digital computers;
    performing a plurality of analytical algorithms to categorize the plurality of suspect objects with one or more scores for each suspect object based on their security threat;
    transmitting said one or more scores to a correlation facility;
    aggregating the one or more scores, optionally with other information about each suspect objects, into the form of aggregate data representing one or more aggregate features of the plurality of suspect objects;
    determining that at least one of the plurality of suspect objects is a suspected security threat based at least on the one or more scores; and
    in response to determining that at least one of the plurality of suspect objects is a suspected security threat, generating an infection verification pack (IVP) including routines, the infection verification pack configured to be executed on an end-point machine within the computer networking environment that used or executed the suspected security threat.

2. The method of claim 1, further comprising filtering the suspect objects based on reputation filtering, wherein the suspect objects are compared to a database of objects which have been previously scored by their reputation among a plurality of users of end-point machines who have used or executed the objects.

3. The method of claim 1, wherein the inspection methods are selected from the group consisting of (a) instantiating and executing the suspect object within a sandboxed virtualized environment and inspecting its behavior; (b) instantiating and executing the suspect object within an emulation environment and inspecting its behavior; (c) inspecting the suspect object statically to identify signatures of known malware; and (d) identification of command and control patterns in network communication.

4. The method of claim 1, wherein the analytical algorithms comprises calculating a score representing probability that one or more of the suspect objects are malware based on a hierarchical Bayesian network.

5. The method of claim 1, wherein the analytical algorithms comprises calculating a score representing probability that one or more of the suspect objects are malware based on a linear classifier based on a plurality of feature values, each feature value representing a characteristic of one or more suspect objects.

6. The method of claim 1, wherein the analytical algorithms comprises classifying one or more suspect objects based on pre-defined heuristics.

7. A general purpose computer comprising:
    one or more processors, each comprising at least one arithmetic logic unit;
    a data receiver in connection with a networking environment;
    a digital memory;
    one or more interconnection busses configured to transmit data between the one or more processors, the data receiver, and the digital memory;
    wherein the digital memory is loaded with an executable application program comprising instructions to perform the steps of:
        identifying a plurality of suspect objects including data about network transactions or computer operations suspected of being linked to a security risk,
        transmitting the plurality of suspect objects to an inspection service operating on one or more general purpose digital computers,
        inspecting the plurality of suspect objects using a plurality of inspection methods to create digital information about the nature of the potential threat posed by the plurality of suspect objects,
        transmitting said digital information to an analytical service operating on one or more general purpose digital computers,
        performing a plurality of analytical algorithms to categorize the plurality of suspect objects with one or more scores for each suspect object based on their security threat,
        transmitting said one or more scores to a correlation facility,
        aggregating the one or more scores, optionally with other information about each suspect objects, into the form of aggregate data representing one or more aggregate features of the plurality of suspect objects, determining that at least one of the plurality of suspect objects is a suspected security threat based at least on the one or more scores, and in response to determining that at least one of the plurality of suspect objects is a suspected security threat, generating an infection verification pack (IVP) including, the infection verification pack configured to be executed on an end-point machine within the computer networking environment that used or executed the suspected security threat, wherein the step of transmitting the plurality of suspect objects to an inspection service comprises transmission to the data receiver.

* * * * *

UNITED STATES PATENT AND TRADEMARK OFFICE
CERTIFICATE OF CORRECTION

PATENT NO. : 9,686,293 B2  
APPLICATION NO. : 14/629444  
DATED : June 20, 2017  
INVENTOR(S) : Ali Golshan et al.

Page 1 of 1

It is certified that error appears in the above-identified patent and that said Letters Patent is hereby corrected as shown below:

On the Title Page

Please correct the Inventors (72) to read as follows:
Ali Golshan, Santa Clara, CA (US)
Fengmin Gong, Livermore, CA (US)
Frank Jas, Scotts Valley, CA (US)
Mikola Bilogorskiy, Sunnyvale, CA (US)
Neal Vu, San Jose, CA (US)
Chenghuai Lu, Fremont, CA (US)
Alexander Burt, San Jose, CA (US)
Manikandan Kenyan, Saratoga, CA (US)
Yucheng Ting, Milpitas, CA (US)

Signed and Sealed this
Seventh Day of August, 2018

Andrei Iancu
*Director of the United States Patent and Trademark Office*